United States Patent
Klinger et al.

(10) Patent No.: US 7,493,495 B2
(45) Date of Patent: Feb. 17, 2009

(54) BIOMETRICS INTERFACE

(75) Inventors: Florian Klinger, Yavne (IL); Youval Rasin, Tel Aviv (IL); George P. Kongalath, St. Laurent (CA)

(73) Assignee: Bioguard Components and Technology Ltd., Rosh Ha'avin (IL)

( * ) Notice: Subject to any disclaimer, the term of this patent is extended or adjusted under 35 U.S.C. 154(b) by 857 days.

(21) Appl. No.: 10/203,897

(22) PCT Filed: Feb. 13, 2001

(86) PCT No.: PCT/IL01/00137

§ 371 (c)(1),
(2), (4) Date: Apr. 17, 2003

(87) PCT Pub. No.: WO01/59970

PCT Pub. Date: Aug. 16, 2001

(65) Prior Publication Data

US 2004/0128519 A1 Jul. 1, 2004

(30) Foreign Application Priority Data

Feb. 14, 2000 (IL) .................................... 134527

(51) Int. Cl.
*H04L 9/32* (2006.01)
(52) U.S. Cl. ...................................................... 713/186
(58) Field of Classification Search ............... 902/3, 902/4, 5; 382/116, 117

See application file for complete search history.

(56) References Cited

U.S. PATENT DOCUMENTS

| 5,467,403 | A | * | 11/1995 | Fishbine et al. | 382/116 |
| 5,546,471 | A | | 8/1996 | Merjanian | |
| 5,613,012 | A | * | 3/1997 | Hoffman et al. | 382/115 |
| 5,615,277 | A | * | 3/1997 | Hoffman | 382/115 |
| 5,647,364 | A | * | 7/1997 | Schneider et al. | 600/445 |
| 5,872,834 | A | * | 2/1999 | Teitelbaum | 379/93.03 |
| 5,920,640 | A | * | 7/1999 | Salatino et al. | 382/124 |
| 5,999,806 | A | * | 12/1999 | Kaplan et al. | 455/411 |
| 6,038,666 | A | * | 3/2000 | Hsu et al. | 713/186 |
| 6,208,264 | B1 | * | 3/2001 | Bradney et al. | 340/5.2 |
| 6,219,793 | B1 | * | 4/2001 | Li et al. | 726/19 |
| 6,484,260 | B1 | * | 11/2002 | Scott et al. | 713/186 |

FOREIGN PATENT DOCUMENTS

| WO | WO-98/11750 A3 | 3/1998 |
| WO | WO-98/51103 A2 | 11/1998 |
| WO | WO-00/07351 A1 | 2/2000 |

* cited by examiner

*Primary Examiner*—Matthew B Smithers
(74) *Attorney, Agent, or Firm*—Darby & Darby PC

(57) ABSTRACT

A personal identifier including a biometric sensor providing at least one biometric output and a sensor identification output, and an encryption functionality for encrypting the at least one biometric input and the sensor identification output to provide an encrypted identification output. A personal identification method is also disclosed.

12 Claims, 5 Drawing Sheets

BIOMETRICS INTERFACE

FIELD OF THE INVENTION

The present invention relates to communication with biometrics identification and verification generally, and more particularly to a universal biometrics interchange protocol for business and the like, wherein an interface is provided for biometrics identification and verification that communicates in accordance with any protocol standard.

BACKGROUND OF THE INVENTION

Biometrics, such as fingerprint, voice, face, palm, etc. identification and verification is well known in the field of communication, network security, law enforcement, automatic teller machines (ATM), access control, and employee identification, for example. Hardware and software for fingerprint identification is readily available from a number of manufacturers. In particular, fingerprint identification modules are known that are built into a mobile phone. A user must first place his/her finger on the fingerprint identification module, whereupon the fingerprint is verified and if valid, the user is authorized to effect communication with the required destination. Such systems are used in e-commerce, for example.

A problem exists in prior art fingerprint and other biometrics feature identification communication systems. There are several protocol standards used in these systems. This means that not every fingerprint identification module will be able to communicate with the desired destination. It is economically and logistically impractical to equip every user with several modules and mobile phones to cover all of the protocol standards.

SUMMARY OF THE INVENTION

The present invention seeks to provide an improved universal biometrics interchange protocol for business and the like, wherein an interface is provided for biometrics identification and verification that communicates in accordance with any protocol standard. The biometrics interface can accept data from any kind of biometrics sensor, such as a fingerprint identification sensor, palm identification sensor, DNA sensor, thermograph or other heat sensor, or video system for facial recognition, for example. The biometrics interface can also use any combination of multiple biometrics sensors, thereby providing a high level of security. The biometrics interface is preferably housed internally or externally as part of a data interchange device, such as a mobile telephone, for example.

The seller and the buyer can communicate with each other via the Internet, for example. Biometrics information for identification and verification resides in the biometrics server, transforming the server into a "bioserver" or "biotrustee". The bioserver can communicate with the seller, but for security purposes, the seller preferably cannot interrogate the bioserver. The biometrics universal interface of the present invention provides mutual communication between the customer and the bioserver for biometrics identification and verification in accordance with any protocol standard.

There is thus provided in accordance with a preferred embodiment of the present invention a biometrics identification universal interface including an input interface operative to receive biometrics identification data signals (or transaction details), an output converter operative to convert the data signals into converted signals suitable for transmission to a personal communications service (PCS) via a data interchange device, in accordance with any protocol standard selected from a plurality of standards that define how a wireless signal is transmitted from the data interchange device to a service provider network, and a transmitter in communication with the output converter operative to transmit the converted signals to a PCS.

In accordance with a preferred embodiment of the present invention the transmitter may include an RF transmitter, an infrared transmitter or a signal modulator.

Further in accordance with a preferred embodiment of the present invention a receiver is provided for receiving signals from a PCS. The receiver may include an RF receiver, an infrared receiver or a signal demodulator.

Still further in accordance with a preferred embodiment of the present invention a signal processor is in communication with the input interface operative to process the data signals.

Additionally in accordance with a preferred embodiment of the present invention a switch is operatively connected to the output converter that switches between which kind of transmission/reception to use.

In accordance with a preferred embodiment of the present invention an encryption unit encrypts the data signals prior to transmission.

Further in accordance with a preferred embodiment of the present invention an optical element is in operative communication with the output converter, operative to scan characters.

Still further in accordance with a preferred embodiment of the present invention a biometrics acquisition module is provided that sends biometrics identification data signals to the input interface.

In accordance with a preferred embodiment of the present invention the biometrics acquisition module includes a biometrics identification sensor and biometrics data circuitry that processes biometrics information sensed by the sensor. The biometrics identification sensor may include a fingerprint identification sensor, a palm identification sensor, a DNA sensor, a thermograph or a video system for facial recognition.

Further in accordance with a preferred embodiment of the present invention the biometrics acquisition module includes an output interface that communicates the biometrics identification data signals to the universal interface in at least one of a USB, RS232, RS485, Wiegand, RF connection and infrared connection.

Still further in accordance with a preferred embodiment of the present invention a battery is provided that serves as a power source for a data interchange device, wherein the universal interface is housed in the battery.

Additionally in accordance with a preferred embodiment of the present invention there are provided a data interchange device and a service provider network communicable therewith, wherein the service provider network includes a CPU that processes the converted signals and provides an authorization signal based on the converted signals.

In accordance with a preferred embodiment of the present invention the network assigns a user identity number to a user, and maps more than one biometrics datum of a single user to a single user identity number.

Further in accordance with a preferred embodiment of the present invention the authorization signal activates/deactivates devices, such as locks, gates, etc.

There is also provided in accordance with a preferred embodiment of the present invention an intranet system including a network including a plurality of communication systems, each communication system including an input interface operative to receive biometrics identification data signals, an output converter operative to convert the data signals into converted signals suitable for transmission to a personal communications service (PCS) via a data interchange device, in accordance with any mobile protocol standard selected from a plurality of standards that define how a wireless signal is transmitted from the data interchange device to a service provider network, a transmitter in communication with the output converter operative to transmit the converted signals to a PCS, and a biometrics acquisition module that sends biometrics identification data signals to the input interface, wherein the network includes a CPU operative to verify the biometrics identification data signals in order to authorize entry into the network.

There is also provided in accordance with a preferred embodiment of the present invention a method for biometrics identification, including receiving biometrics data related to at least one fingerprint of an individual, processing the biometrics data, and converting the data into converted signals suitable for transmission to a personal communications service (PCS) via a data interchange device, in accordance with any mobile protocol standard selected from a plurality of standards that define how a wireless signal is transmitted from the data interchange device to a service provider network, selecting a protocol standard for transmitting the converted signals, and transmitting the converted signals via a data interchange device to a PCS.

In accordance with a preferred embodiment of the present invention the method further includes processing the converted signals at the PCS to provide an authorization signal.

There is also provided in accordance with a preferred embodiment of the present invention a method for providing e-commerce including transferring e-commerce transaction details and biometrics data to a biometrics server using a secure communications line, and having the biometrics server match the biometrics data with data stored in memory, and if there is a positive match of data, sending an authorization signal to a vendor via a second secure communications line.

In accordance with a preferred embodiment of the present invention the method further includes transferring payment details to a payment center for executing payment.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
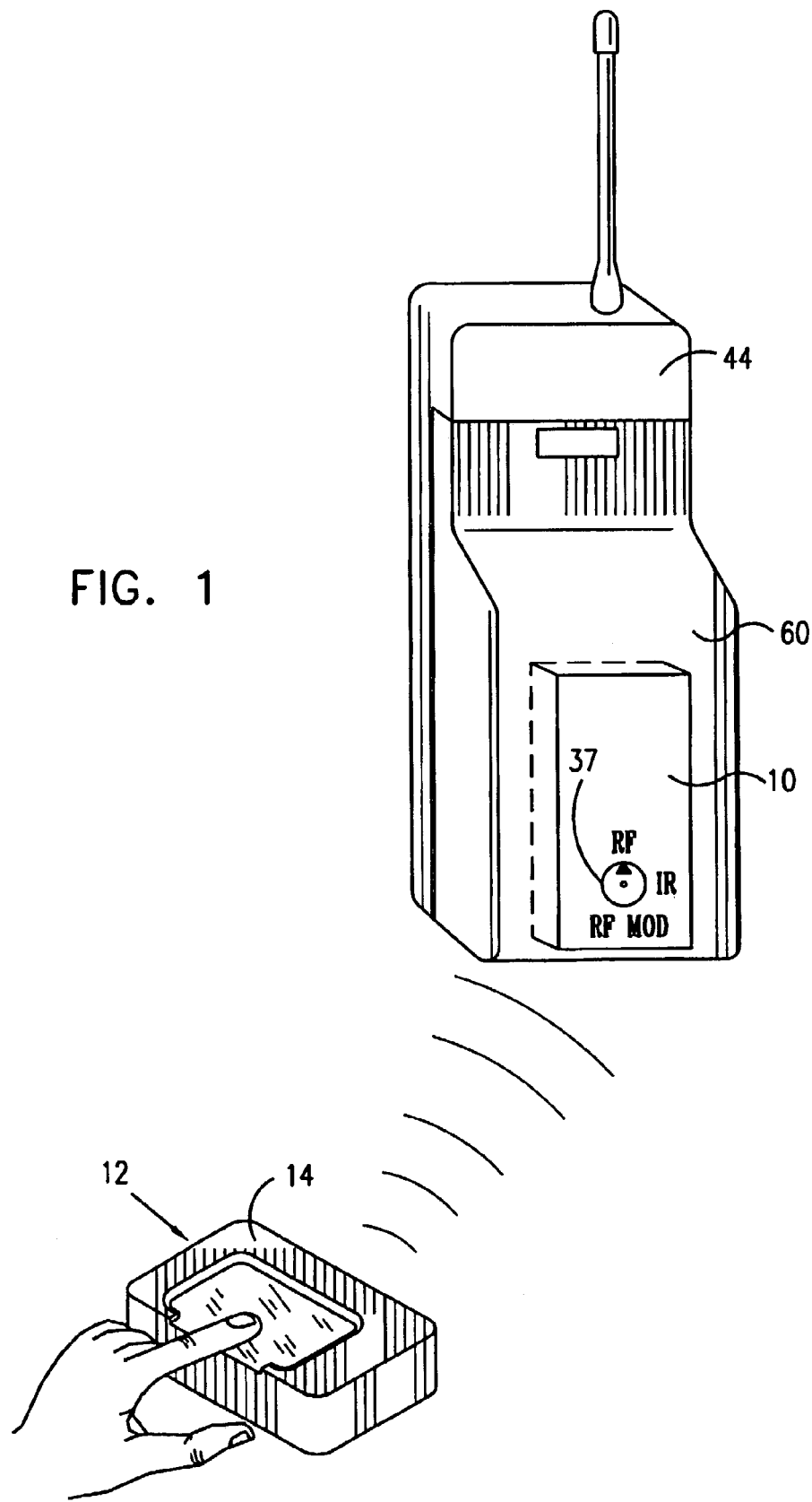
FIG. 1 is a simplified illustration of a biometrics identification universal interface constructed and operative in accordance with a preferred embodiment of the present invention.
Figure 2:
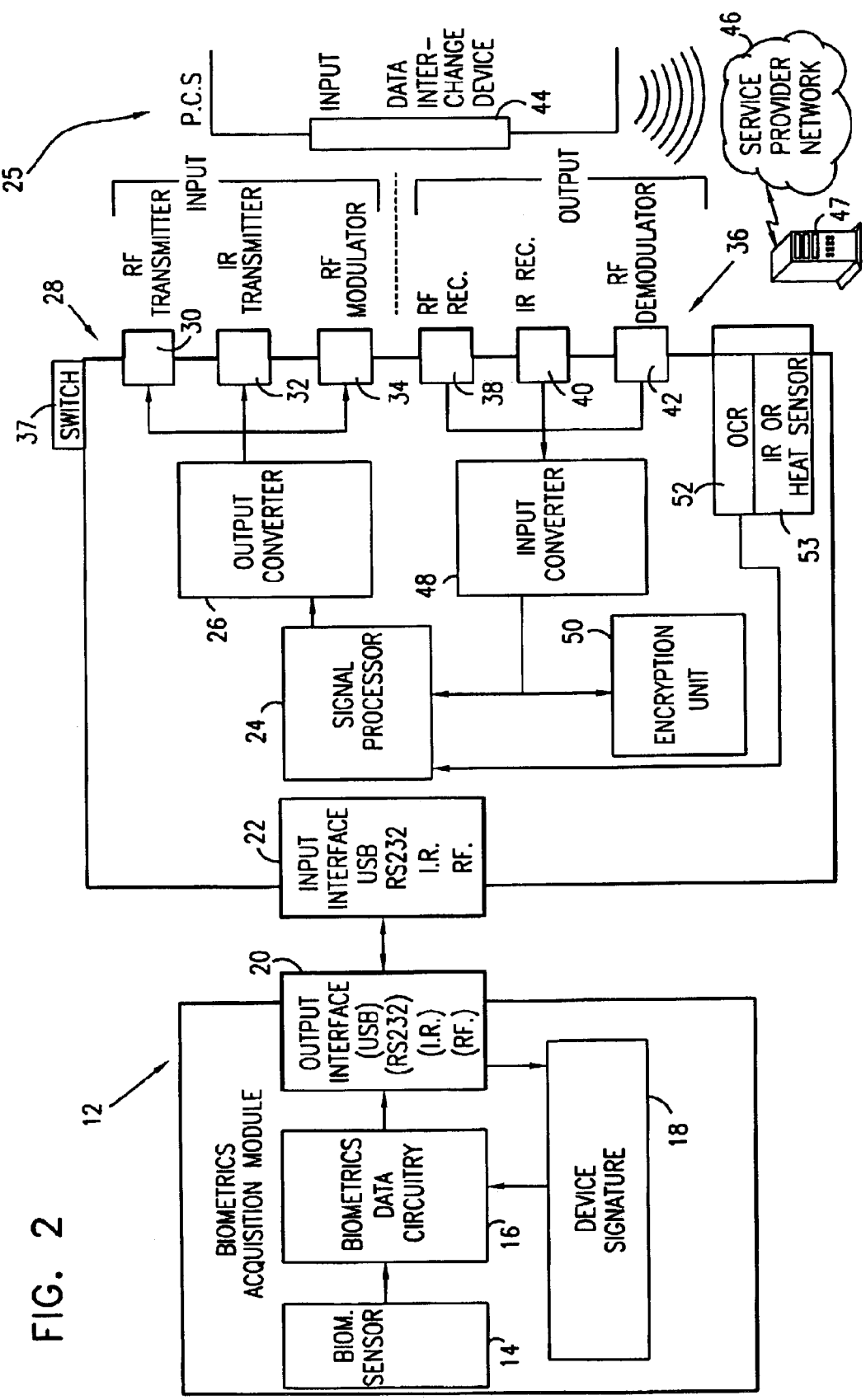
FIG. 2 is a simplified block diagram of the universal interface of FIG. 1.

Reference is now made to FIGS. 1 and 2 which are simplified illustrations of a biometrics identification universal interface 10 constructed and operative in accordance with a preferred embodiment of the present invention.

Universal interface 10 interfaces with any kind of biometrics acquisition module 12. Biometrics acquisition module 12 preferably includes a biometrics identification sensor 14 and biometrics data circuitry 16, which processes the biometrics information sensed by sensor 14 together with a device signature 18 unique to the biometrics acquisition module 12. Biometrics identification sensor 14 may include a fingerprint identification sensor, palm identification sensor or video system for facial recognition, for example. Biometrics data circuitry 16 communicates processed signals via an output interface 20 to universal interface 10. Output interface 20 can communicate with universal interface 10 in any wired or wireless manner, such as USB, RS232, RS485, or Wiegand, or RF or infrared connection, for example.

Universal interface 10 preferably includes an input interface 22 that receives the signals from output interface 20 of biometrics acquisition module 12. Universal interface 10 preferably includes a signal processor 24 that can output data signals in digital or analog format. Analog signals are preferably converted by an A/D output converter 26 to digital signals. A transmitter 28 preferably transmits the signals to a personal communications service (PCS) 25 via a data interchange device 44. Data interchange device 44 may be a mobile phone, computer terminal, keyboard, etc. Transmitter 28 may include one or more types of transmitters, such as an RF transmitter 30, an infrared transmitter 32, and a signal modulator 34. Universal interface 10 also preferably includes a receiver 36 for receiving signals from PCS 25. Receiver 36 can include one or more types of receivers, such as an RF receiver 38, an infrared receiver 40, and a signal demodulator 42. In short, universal interface 10 can communicate with data interchange device 44, either in wired or wireless communication.

PCS 25 can operate in accordance with any mobile protocol standard that defines how a wireless signal is transmitted from data interchange device 44 to a service provider network 46. The three leading standards for mobile digital communication include CDMA (Code Division Multiple Access), GSM and TDMA (Time Division Multiple Access). Other standards exist as well. PCS 25 may be narrow band (such as in the 850-950 MHz range) or broad band (such as in the 1.8-2 GHz range), for example, and also broadly includes analog and digital cellular service. Signals received by receiver 36 from PCS 25 are preferably converted by an input converter 48 and sent to signal processor 24 for processing.

Universal interface 10 preferably includes a switch 37 operatively connected to output converter 26 that enables a user to select which kind of transmission/reception to use, such as RF, IR or RF modulation. Alternatively, input converter 48 may detect which kind of reception is used, and can internally switch universal interface 10 to the proper kind of transmission/reception.

The signals may be encrypted by an encryption unit 50 prior to transmission. Other pertinent information, such as vital statistics, may be input by means of an optical element 52, such as an OCR or camera, that scans printed text or a bar code. Additionally or alternatively, an IR or heat sensor 53 may be used to acquire the pertinent information.

Reference is made again to FIG. 1. In accordance with a preferred embodiment of the present invention, universal interface 10 is housed in a battery 60 that serves as the power source for data interchange device 44. Such a construction is advantageous because it is compact, streamlined and economical. Alternatively, universal interface 10 may be integrated into data interchange device 44 itself, such as in any part of a mobile telephone, for example.

Operation of universal interface 10 commences with receiving biometrics data from biometrics acquisition module 12. Signal processor 24 processes the received data, and together with output converter 26, transmits the data to PCS 25 via data interchange device 44, using the type of communications protocol as set by switch 37 or as internally switched by input converter 48 and signal processor 24. It is important to note that no local processing of the biometrics information is necessary in the present invention. Rather the biometrics information is preferably processed by a CPU 47 residing in or connected to service provider network 46, thereby realizing significant cost, logistics and time savings.

Figure 3:
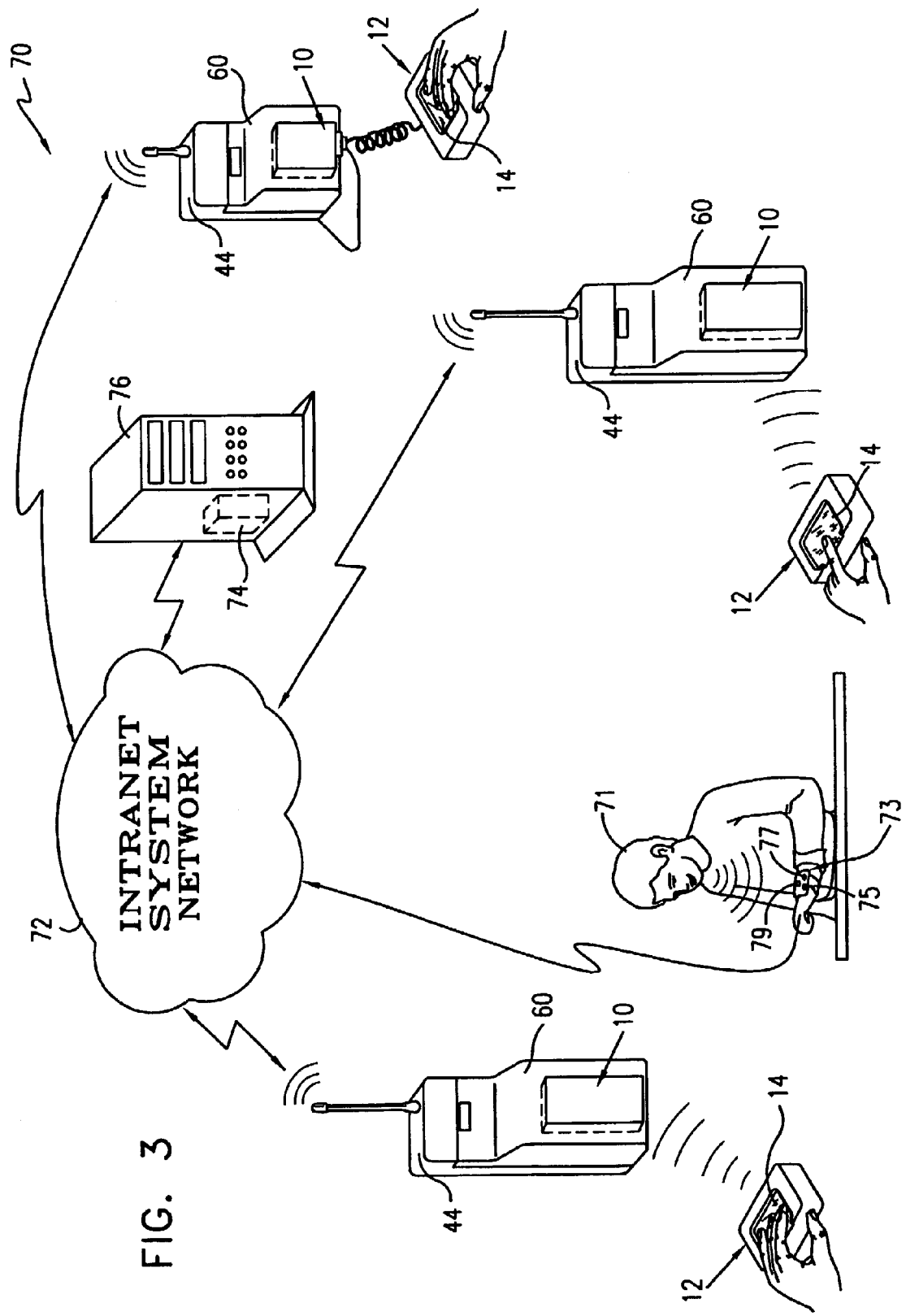
FIG. 3 is a simplified illustration of a customized intranet system that uses the universal interface of FIG. 1, constructed and operative in accordance with a preferred embodiment of the present invention.

Reference is now made to FIG. 3 which illustrates one example of a system that uses the universal interface 10, constructed and operative in accordance with a preferred embodiment of the present invention. The example illustrated is an intranet system 70 that includes a network 72 that communicates with a plurality of data interchange devices 44. Each user of the system can enter only if his/her fingerprints are verified by a CPU 74 of a server 76 connected to or residing in network 72. Network 72 is thus a private, customized intranet system that allows access to only a select number of users. Such a network can be advantageously used in personal communication, wherein it is desired to restrict communication to family members or to board directors, for example.

It is noted that in the system of FIG. 3, as well as any other system of the present invention, it is possible to map more than one fingerprint of a single user to a single user identity number, such as the index, middle and ring fingers, for example. This is in contrast with prior art systems that use only one fingerprint for one user identity number. FIG. 3 also illustrates another variation, in which a user 71 can input a multi-biometrics input. For example, user 71 can wear a wearable mobile phone 73 that has a voice recognition module 75 for recognizing the voice of user 71. Mobile phone 73 can also have a blood vessel sensor 77 and fingerprint sensor 79, for example. In accordance with a preferred embodiment of the present invention, body heat or body motion can be used to recharge or supply power to mobile phone 73.

Figure 4:
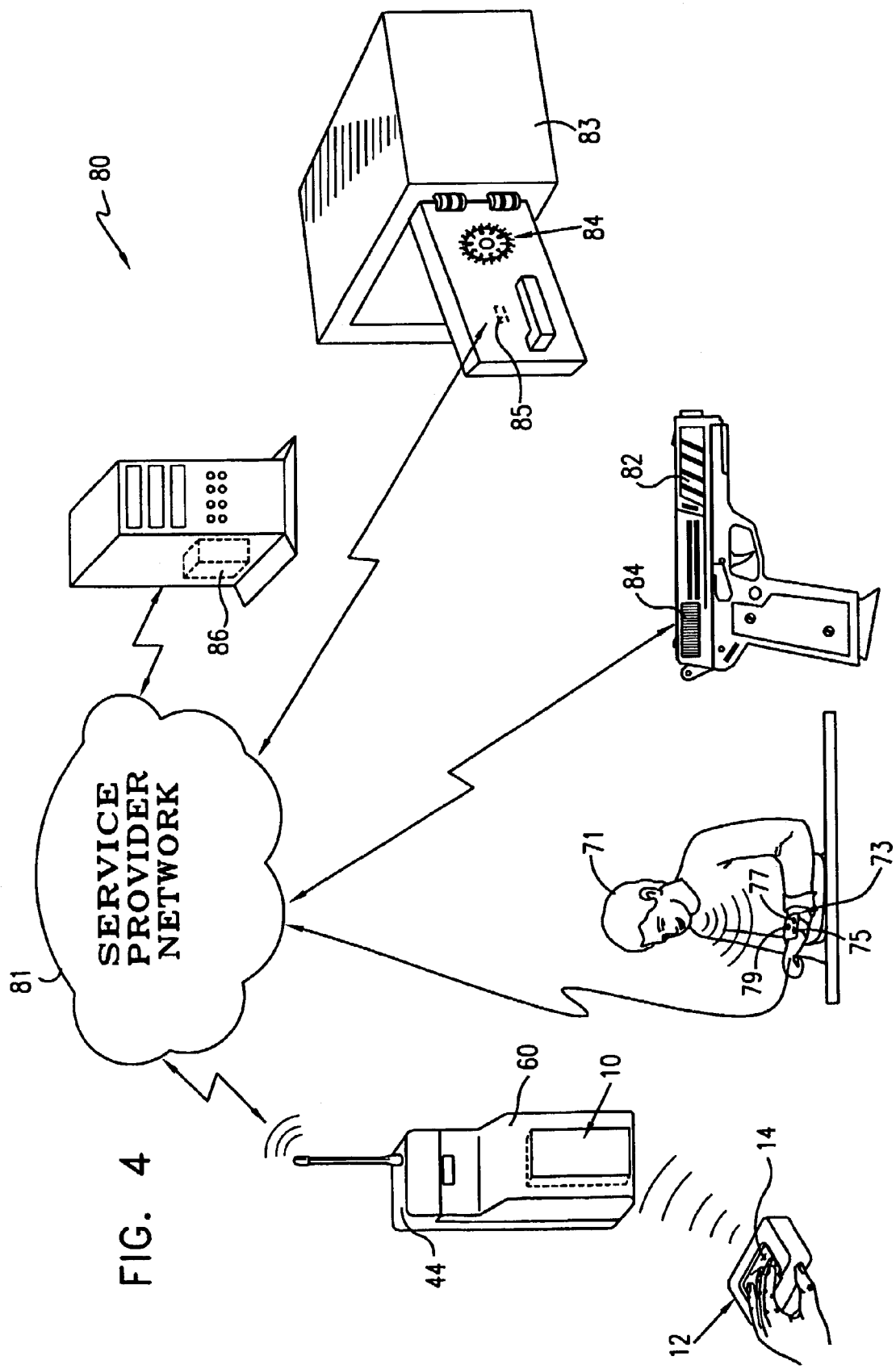
FIG. 4 is a simplified illustration of a virtual locking system that uses the universal interface of FIG. 1, constructed and operative in accordance with a preferred embodiment of the present invention.

Reference is now made to FIG. 4 which illustrates a virtual locking system 80 that uses the universal interface 10 of FIG. 1, constructed and operative in accordance with a preferred embodiment of the present invention. Virtual locking system 80 preferably includes one or more biometrics acquisition modules 12 and universal interfaces 10, that communicate with a service provider network 81 via one or more data interchange devices 44. An item that is to be protected, such as a weapon 82 or a safe 83, is preferably provided with a lock 84. Lock 84 may be an electronic lock, as shown with weapon 82, or a mechanical lock with an electronic interlock 85, as shown with safe 83. A person wishing to use weapon 82 or to gain access to safe 83, must first enter his/her biometrics data (e.g., fingerprints, palm, face) at module 12. Universal interface 10 preferably transmits the biometrics data via data interchange device 44 to a CPU 86 of network 81. If CPU 86 verifies that the biometrics are valid, then CPU 86 authorizes lock 84 (or interlock 85) to open. CPU 86 can also determine at what times the user has authorized access, and what times access is denied. (It is appreciated that the mobile phone 73 described hereinabove with reference to FIG. 3 can also be used in system 80.)

The present invention is particularly advantageous in a business

Figure 5:
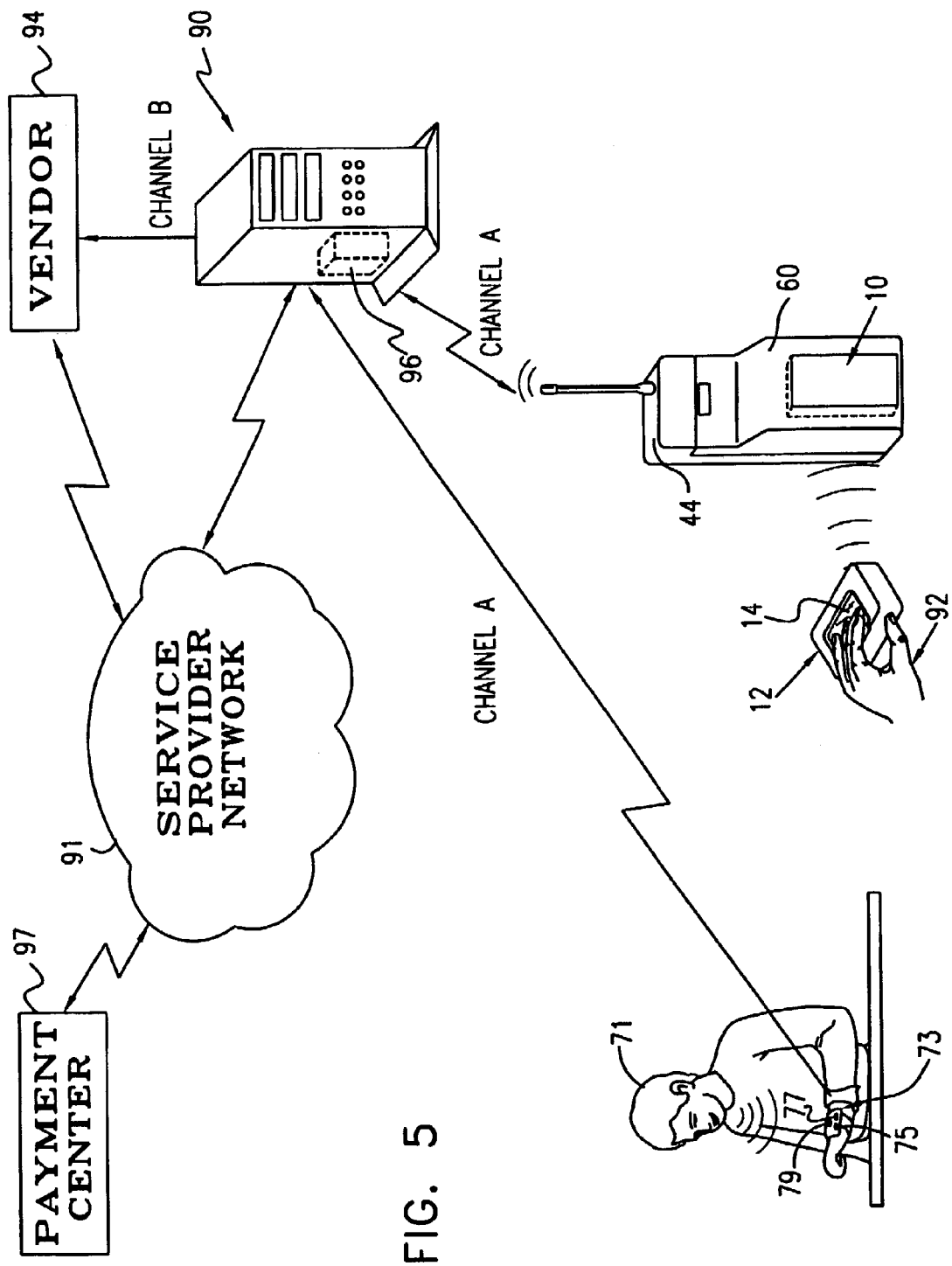
FIG. 5 is a simplified illustration of an e-commerce system that uses the universal interface of FIG. 1, constructed and operative in accordance with a preferred embodiment of the present invention.

The present invention is particularly advantageous in a business environment between a seller, customer and server, such as in an e-commerce system 90, constructed and operative in accordance with a preferred embodiment of the present invention, described with reference to FIG. 5. E-commerce system 90 preferably includes one or more biometrics acquisition modules 12 and universal interfaces 10, that communicate with a service provider network 91 via one or more data interchange devices 44. The mobile phone 73 described hereinabove with reference to FIG. 3 can also be used in system 90.

A buyer 92 may commence a transaction by placing an order indicating an "e-lock option", or any brand name designated for this service, as a method of payment. In this option, buyer 92 transfers his/her e-commerce transaction details, including the value of the goods to be purchased, plus his/her biometrics data (e.g., signature, fingerprint, or palm pattern, etc.) to a biometrics server 96 ("bioserver"), using a secure communications line (channel A). Security is enhanced by using channel A instead of service provider network 91 which is more prone to "listeners" and "hackers". The bioserver receives the transactions details and matches the received biometrics data with data stored in memory. If there is a positive match, bioserver 96 sends an authorization signal or message to a vendor 94 via a separate secure line (channel B). It is noted that security is further enhanced by separating the buyer-bioserver communications line from the bioserver-vendor communications line. Payment details are preferably transferred to a payment center 97, such as a bank/credit card organization, for executing payment for the transaction.

It will be appreciated by persons skilled in the art that the present invention is not limited to what has been particularly shown and described hereinabove. Rather the scope of the present invention includes both combinations and subcombinations of the various features described hereinabove as well as variations and development thereof which would naturally occur to a person of ordinary skill in the art upon reading the disclosure and which are not in the prior art.

What is claimed is:

1. A personal identifier system comprising:
   at least one biometrics acquisition module providing a biometrics acquisition output identifying a person;
   at least one biometrics verification CPU, located remotely from said at least one biometrics acquisition module and communicating wirelessly with said at least one biometrics acquisition module via an interface and being operative to verify said biometrics acquisition output; and
   at least one virtual lock communicating wirelessly with said at least one biometrics verification CPU and being operative to provide authorized access in response to a biometrics verification output from said biometrics verification CPU indicating receipt from said at least one biometrics acquisition module of said biometrics acquisition output identifying an authorized person.

2. A personal identifier system according to claim 1 and wherein said at least one biometrics acquisition module includes a fingerprint sensor.

3. A personal identifier system according to claim 2 and wherein said interface includes encryption functionality.

4. A personal identifier system according to claim 1 and wherein said interface includes encryption functionality.

5. A personal identification method comprising:
   employing a biometrics acquisition module for providing a biometrics acquisition output identifying a person;

communicating said biometrics acquisition output wirelessly to at least one biometrics verifier, located remotely from said at least one biometrics acquisition module;

employing said at least one biometrics verifier to verify said biometrics acquisition output and to provide a biometrics verification output; and communicating said biometrics verification output to an access control device operative to provide authorized access in response to said biometrics verification output from said biometrics verifier indicating receipt from said at least one biometrics acquisition module of said biometrics acquisition output identifying an authorized person.

6. A personal identification method according to claim 5 and wherein said providing a biometrics acquisition output employs a fingerprint sensor.

7. A personal identification method according to claim 6 and also comprising encrypting said biometrics acquisition output.

8. A personal identification method according to claim 7 and wherein said at least one biometrics verifier is located remotely from said biometrics acquisition module.

9. A personal identification method according to claim 6 and wherein said at least one biometrics verifier is located remotely from said biometrics acquisition module.

10. A personal identification method according to claim 5 and also comprising encrypting said biometrics acquisition output.

11. A personal identification method according to claim 10 and wherein said at least one biometrics verifier is located remotely from said biometrics acquisition module.

12. A personal identification method according to claim 5 and wherein said at least one biometrics verifier is located remotely from said biometrics acquisition module.

* * * * *